US009268745B2

(12) United States Patent
Aksenova

(10) Patent No.: US 9,268,745 B2
(45) Date of Patent: Feb. 23, 2016

(54) METHOD FOR FAST WAVELET TRANSFORM OF A SIGNAL

(71) Applicant: Commissariat A L'Energie Atomique Et Aux Energies Alternatives, Paris (FR)

(72) Inventor: Tetiana Aksenova, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 529 days.

(21) Appl. No.: 13/627,460

(22) Filed: Sep. 26, 2012

(65) Prior Publication Data

US 2013/0191430 A1 Jul. 25, 2013

(30) Foreign Application Priority Data

Sep. 26, 2011 (FR) ...................................... 11 58579

(51) Int. Cl.
*G06F 17/14* (2006.01)
(52) U.S. Cl.
CPC ................................... *G06F 17/148* (2013.01)
(58) Field of Classification Search
None
See application file for complete search history.

(56) References Cited

U.S. PATENT DOCUMENTS 6,009,447 A * 12/1999 Kubota et al. ................. 708/313
6,898,756 B1 * 5/2005 Fekri et al. .................... 714/786

OTHER PUBLICATIONS

Masako Omachi, et al.; "Fast Calculation of Continuous Wavelet Transform Using Polynomial"; 2007 International Conference on Wavelet Analysis and Pattern Recognition; Jan. 1, 2007; pp. 1688-1691; XP55034611.
Lorella Fatone; "Wavelet Bases Made of Piecewise Polynomial Functions: Theory and Application"; Applied Mathematics; vol. 2, No. 2; Feb. 1, 2011; pp. 196-216; XP55034882.
B.M. Kessler et al.; "Wavelet Notes"; Apr. 12, 2003; XP55034884, Retrieved from http://arxiv.org/pdf/nucl-th/0305025v2.pdf..
Unser M et al.; "A Family of Polynomial Spline Wavelet Transforms"; Signal Processing, Elsevier Science Publishers B. V. Amsterdam, NL; vol. 30, No. 2 Jan. 1, 1993; pp. 141-162; XP026650391.
Search Report from French Patent Application No. 11/58579, dated Aug. 16, 2012.
Pesquet-Popescu, et al; "Wavelets and Applications"; Techniques de l'Ingenieur, Chapter TE 5 215.

* cited by examiner

*Primary Examiner* — Michael D Yaary
(74) *Attorney, Agent, or Firm* — Alston & Bird LLP

(57) ABSTRACT

Method for determining at least one wavelet coefficient $W_s(\tau)$ of a wavelet transform of a signal in which the mother wavelet of the transform has a support subdivided into $J \geq 1$ intervals bound by $(J+1)$ extremity points, and is defined by a polynomial of a maximum level $N \geq 1$ on each interval. The method includes calculating all or some of the primitives of the signal of order k between 2 and N+1, at least at (J+1) points corresponding to extremity points of the intervals of the wavelet support dilated by a factor of s and translated by a time $\tau$; calculating the convolution of said or each primitive sampled in this way with a respective succession of (J+1) coefficients $C_i^k(s)$, dependent upon said wavelet; and determining the wavelet coefficient by calculating a linear combination of convolutions. Steps a) to c) are implemented by a processor configured or programmed in an appropriate manner.

13 Claims, 1 Drawing Sheet

METHOD FOR FAST WAVELET TRANSFORM OF A SIGNAL

FIELD

The invention relates to a method for fast wavelet transform of a signal. A method according to the invention is implemented using a processor, preferably in real time. The invention also relates to a processor configured or programmed for the implementation of such a method.

The method is particularly appropriate to the implementation of a continuous wavelet transform, but may equally be applied to the case of a discrete transform.

The signal to be transformed is generally a digital signal; it may in particular be a signal obtained by sampling and quantifying an analog signal, representative of a physical quantity. The method of the invention may be applied in particular to the processing of neuronal signals (neuro-electrical signals), especially in neuronal control or brain-computer interface systems.

BACKGROUND

Wavelet transform is an important tool in signal processing, used in particular to perform time-frequency analyses. In general terms, a wavelet transform is described by the convolution:

$$W_s(\tau) = \frac{1}{\sqrt{s}} \int_{-\infty}^{\infty} x(t) \psi^*\left(\frac{t-\tau}{s}\right) dt \quad (1)$$

where:
t is time;
x(t) is the signal to be transformed;
function $\psi \in L^2(\mathbb{R})$ is the "mother wavelet", also called the "generator function"; it generally presents a compact support $[-\alpha, +\alpha]$;
s>0 is called the "scale factor";
$\tau$ is the time delay;
"*" indicates the conjugate complex; in fact, $\psi$ can generally be a function with complex values, but in the following we shall consider, without losing generality, the case where it is a real function;
$W_s(\tau)$ is a wavelet coefficient dependent on s and $\tau$.

We talk about "Discrete Wavelet Transform" (DWT), when $s=a^m$ and $\tau=nb$, where m,n are positive integers. If s and $\tau$ can adopt any value—any positive value in the case of s—we talk about "Continuous Wavelet Transform" (CWT), even if signal x is discrete, which is generally the case, to allow it to be digitally processed.

DWTs are generally more suitable for processing neuronal signals, for example, because they allow said signals to be analyzed at the desired frequential resolution.

For more details on wavelet transform, one may refer to: Beatrice Pesquet-popescu and Jean-Christophe Pesquet "Ondelettes et applications" ("Wavelets and applications"), Techniques de l'Ingénieur, Chapter TE 5 215.

Fast algorithms have been developed for performing discrete wavelet transforms. In contrast, continuous wavelet transforms remain relatively onerous in terms of time and resources, which limits their use in real time applications and low energy consumption applications.

In a conventional manner, a CWT is implemented, in an approximate fashion, by replacing the integral of equation (1) by a discrete sum. The case of a signal x(t) sampled at discrete intervals t=-1, 0, 1, 2 . . . is considered (for the sake of simplicity, and without losing generality, the time scale is taken such that its discretization step equals 1), and $x_i=x(t_i)$ is put down; the mother wavelet $\psi$ is defined on a compact support $[-\alpha, +\alpha]$. The function:

$$\psi_s(t) = \frac{1}{\sqrt{s}} \psi\left(\frac{t}{s}\right)$$

is defined, whose support is $[-\alpha_s, +\alpha_s]$ where $\alpha_s=\alpha/s$. Equation (1) then becomes:

$$W_s(\tau) = \int_{-\alpha_s}^{\alpha_s} x(t+\tau)\psi_s(t)\,dt = \sum_{i=-\alpha_s}^{\alpha_s-1} \int_i^{i+1} x(t+\tau)\psi_s(t)\,dt$$

To calculate this sum of integrals, we make the piecewise constant signal approximation: $x(t)=x_i$ $\forall t\in[i, i+1[$ (other approximations are possible, for example, linear interpolation between t=i and t=i+1); furthermore, one limits oneself to integer values of $\tau(\tau= \ldots, -1, 0, 1, \ldots )$. One can therefore write:

$$W_s(\tau) = \sum_{i=-\alpha}^{\alpha-1} A_i x_{i+\tau} \quad (2)$$

with $A_i = \int_i^{i+1} \psi_s(t)\,dt$.

By considering the coefficients $A_i$ as known, which can be calculated once and for all, one sees that determining a single wavelet coefficient requires $(2\alpha-1)$ multiplications and $(2\alpha-2)$ sums. Now, $\alpha$ can adopt relatively large values, for example, to make a time-frequency analysis of a signal sampled at 1 kHz in frequency range 10 Hz-300 Hz with Meyer wavelets, $\alpha$ is typically between 100 and 3000.

The article by M. Omachi and S. Omachi "Fast calculation of continuous wavelet transform using polynomial", Proceedings of the 2007 International Conference on Wavelet Analysis and Pattern Recognition, Beijing, China, 2-4 Nov. 2007 describes a fast CWT method for a signal, in which the number of operations required does not depend on $\alpha$. In this method, the mother wavelet is defined by a polynomial of order d on a compact support: typically, order d and the coefficients of the polynomial are chosen in such a way as to approximate, with the desired accuracy, a non-polynomial "reference" wavelet, such as a Haar wavelet. The wavelet coefficients are calculated in a recursive manner; hence $W_s(\tau)$ is calculated from $W_{s-1}(\tau)$, the scale factor being considered an integer. The computational cost of calculating coefficient $W_s(\tau)$ is O(ds).

This method has a certain number of disadvantages.

Firstly, the polynomial approximation of a "reference wavelet", such as the Haar wavelet, may necessitate recourse to a high order d, which increases the computational cost of the method accordingly.

Secondly, it does not allow coefficients $W_s$ to be determined for different values of s—and therefore for different frequencies—independently of each other. On the contrary, the recursive character of the algorithm means that the determination of Ws necessarily involves determining $W_1 \ldots W_{s-1}$. The method of M. Omachi and S. Omachi is therefore not optimized for the applications in which a signal has to be analyzed only in certain spectral bands.

SUMMARY

The invention aims to obtain a method enabling fast determination of at least one wavelet coefficient $W_s(\tau)$ of a wavelet transform of a signal without displaying the aforementioned disadvantages of the prior art.

One object of the invention enabling this aim to be achieved is a method for determining at least one wavelet coefficient $W_s(\tau)$ of a wavelet transform of a signal, said wavelet transform being defined in relation to a mother wavelet, wherein:

said mother wavelet is a continuous function, having a support subdivided into J≥1 intervals bound by (J+1) extremity points, said function being defined by a polynomial of maximum level N≥1 on each said interval;

and wherein said method includes the steps consisting in:
a) calculating all or some of the primitives of said signal of order k comprised between 2 and N+1, at least at (J+1) points corresponding to said extremity points of the intervals of the wavelet support dilated by a factor of and translated by a time τ;
b) calculating the convolution of said or each said primitive sampled in this way with a respective succession of (J+1) coefficients $C_i^k(s)$, dependent on said wavelet; and
c) determining said wavelet coefficient by calculating a linear combination of said convolutions;
said steps a) to c) being implemented by a processor configured or programmed in an appropriate manner.

Contrary to the case of the algorithm of M. Omachi and S. Omachi, the mother wavelet in the method of the invention is not polynomial, but piecewise polynomial. The maximum order N can therefore be kept small (typically N=2 or N=3) while making it possible effectively to approximate any reference mother wavelet on a compact support. The computational cost depends at the same time on N (maximum polynomial order defining the mother wavelet), on J (number of intervals or pieces) and on the regularity of wavelet ψ, piecewise polynomial; one therefore has a plurality of parameters at one's disposal enabling the method to be optimized. Furthermore, the different coefficients $W_s(\tau)$ can be determined independently of each other.

According to different embodiments of the method of the invention:

Said coefficients $C_i^k(s)$ can be dependent upon the discontinuities of the derivatives of orders between 1 and N of the wavelet, corresponding to said extremity points of the intervals constituting its support.

Stages b) and c) can be implemented by applying the following equation:

$$W_s(\tau) = \sum_{k=2}^{N+1} \sum_{i=0}^{J} (-1)^{k-1} C_i^k(s) X^{(k)}\left(\tau + \frac{\alpha_i}{s}\right)$$

where:
$W_s(\tau)$ is the desired wavelet coefficient, corresponding to a time delay τ and to a dilatation s of a mother wavelet ψ(t);
$X^{(k)}(t)$ is the order k primitive of the signal;
$\alpha_i$ are the extremity points of the intervals constituting the support of the mother wavelet, taken in order; and $C_i^k(s)$, with i between 0 and J, are the coefficients forming the succession with which the order k primitive of the signal is convoluted.

In particular, the coefficients $C_i^k(s)$ can be given by:

$$C_i^k(s) = (\psi_{i-1}^s)^{(k-1)}\left(\frac{\alpha_i}{s}\right) - (\psi_i^s)^{(k-1)}\left(\frac{\alpha_i}{s}\right),$$

$$i = 1, \ldots, J-1$$

$$C_0^k(s) = -(\psi_0^s)^{(k-1)}\left(\frac{2\alpha_0}{s}\right)$$

$$C_J^k(s) = (\psi_J^s)^{(k-1)}\left(\frac{\alpha_J}{s}\right)$$

where $(\psi_i^s)^{(k-1)}$ is the derivative of order (k−1) of the function $$\psi_i^s = \psi_i^s(t) = \frac{1}{\sqrt{s}}\psi_i\left(\frac{t}{s}\right),$$

$\psi_i$ being the polynomial that defines the mother wavelet at the $i^{th}$ interval of its support.

Said step a) can include:
a1) calculation of said primitives of order k comprised between 2 and N+1 of said signal; and
a2) their sampling at (J+1) sampling points corresponding to said extremity points of the intervals on the wavelet support dilated by a factor of s and translated by a time τ.

In a case particularly simple to implement, said wavelet can be a continuous function and can have a first continuous derivative, piecewise polynomial of order of two; in this case, said step a) consists in calculating only the order primitive of order 3 of said signal and steps b) and c) can be implemented by applying the following equation:

$$W(\tau) = \sum_{i=0}^{J} B_i X^{(3)}\left(\tau + \frac{\alpha_i}{s}\right)$$

where:

$$B_i = 2\frac{1}{\sqrt{s}}\frac{1}{s^2}(p_{i-1} - p_i), i = 1, \ldots, J-1;$$

$$B_0 = -2\frac{1}{\sqrt{s}}\frac{1}{s^2}p_0;$$

$$B_J = \frac{1}{\sqrt{s}}\frac{1}{s^2}2p_J.$$

Said step a) can be implemented in real time, said primitives then being calculated as cumulative sums during an acquisition step of said signal, then saved to a first memory of said processor. Furthermore, said successions of coefficients $C_i^k(s)$ can be saved to a second memory of said processor prior to said acquisition step of said signal.

Another object of the invention is a method for wavelet transform of a signal in discrete or discretized time, comprising the determination of a plurality of wavelet coefficients associated with different dilatations/translations of a single mother wavelet, wherein each said wavelet coefficient is determined by a method as described above.

Yet another object of the invention is a method for wavelet transform of a signal, comprising the determination of a plurality of wavelet coefficients associated with different dilatations/translations of a single mother wavelet, wherein each wavelet coefficient $W_s(\tau)$, corresponding to a time delay $\tau$ and to a dilatation s of a mother wavelet $\psi(t)$, is determined by a method as described above, in which:

said step a) is implemented in real time, said primitives being calculated as cumulative sums during an acquisition step of said signal, then saved to a first memory of said processor;

said steps b) and c) are implemented in real time using successions of coefficients saved beforehand to a second memory of said processor;

the wavelet coefficients $W_s(\tau)$, corresponding to a time delay $\tau$ and to a dilatation s of a mother wavelet $\psi(t)$, being determined from the time $t=\tau+\alpha/s$, where $\alpha$ is half the width of the support of said mother wavelet.

Said signal can be a digital signal, obtained if necessary by sampling and quantifying an analog signal. In particular, the signal can be a signal acquired by a detector such as an electrode, a photosensitive cell, an acoustic detector, or in a general manner, any detector or sensor delivering an electrical signal under the effect of a physical, chemical or biological parameter. Even more particularly, it can be a signal representative of a neuronal activity of a brain, especially a human brain (neurological or neuro-electrical signal).

Yet another object of the invention is a processor configured or programmed to implement a method according to one of the preceding claims. By processor, one means any machine for processing information; typically, this could be an electronic processor, preferably digital. In particular, it could be a conventional computer programmed in an appropriate manner, a processor dedicated to processing digital signals (a digital signal processor or DSP), a wired digital circuit, a programmed/wired hybrid system etc.

BRIEF DESCRIPTION OF THE DRAWINGS

Other characteristics, details and advantages of the invention will emerge from reading the description given with reference to the attached drawings given as examples and in which, respectively.

DETAILED DESCRIPTION

Figure 1:
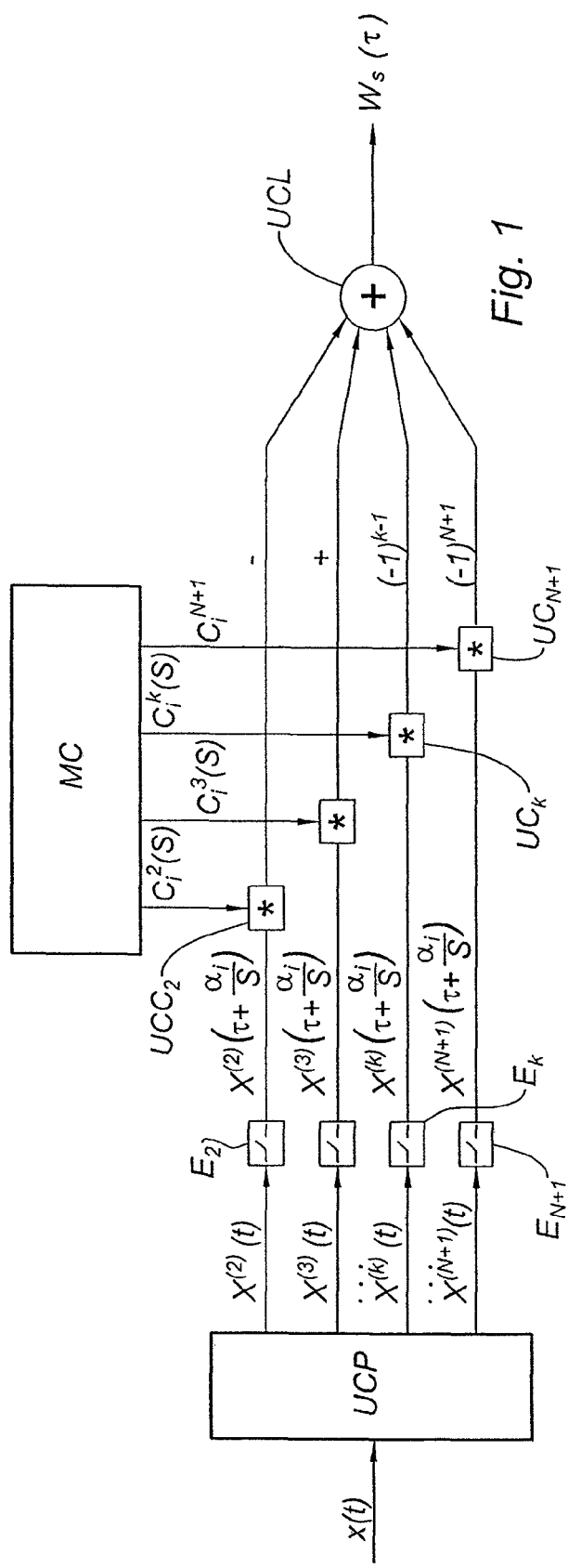
FIG. 1 illustrates a block diagram of a method according to an embodiment of the invention.

The method according to the invention will first be illustrated in the simple case of a mother wavelet, quadratic piecewise (N=2), defined on the interval $[-\alpha, \alpha]$, and for s=1. In this case, we can write:

$$W(\tau) = \int_{-\alpha}^{\alpha} x(t+\tau)\psi(t)dt \tag{3}$$

Let $-\alpha=\alpha_0<\alpha_1<\ldots<\alpha_J=\alpha$ be the partition of the support $[-\alpha, \alpha]$; the mother wavelet $\psi(t)$, which is continuous, is then defined by:

$$\psi(t) = \begin{cases} p_j t^2 + q_j t + r_j & \forall t \in [\alpha_j, \alpha_{j+1}] \\ \psi(t) = 0 & \forall |t| \geq \alpha \end{cases} \tag{4}$$

By integrating (3) by parts, one obtains:

$$\begin{aligned} W(\tau) &= \int_{-\alpha}^{\alpha} x(t+\tau)\psi(t)dt \\ &= \sum_{j=0}^{J-1} \int_{\alpha_j}^{\alpha_{j+1}} x(t+\tau)\psi(t)dt = \\ &= \sum_{j=0}^{J-1} \left( X^{(1)}(t+\tau)\psi(t) \Big|_{\alpha_j}^{\alpha_{j+1}} - \int_{\alpha_j}^{\alpha_{j+1}} X^{(1)}(t+\tau)\psi'(t)dt \right). \end{aligned} \tag{5}$$

where $X^{(1)}(t)$ is an order 1 primitive of function $x(t)$, namely a function whose first derivative relative to t is $x(t)$.

For a continuous mother wavelet $\psi(t)$, and considering that: $\psi(-\alpha)=\psi(\alpha_0)=\psi(\alpha_J)=\psi(\alpha)=0$, we have:

$$\begin{aligned} \sum_{j=0}^{J-1} X^{(1)}(t+\tau)\psi(t) \Big|_{\alpha_j}^{\alpha_{j+1}} &= \sum_{j=0}^{J-1} \left( \begin{array}{c} X^{(1)}(\alpha_{j+1}+\tau)\psi(\alpha_{j+1}) - \\ X^{(1)}(\alpha_j+\tau)\psi(\alpha_j) \end{array} \right) = \\ &= \sum_{j=1}^{J} (X^{(1)}(\alpha_j+\tau)\psi(\alpha_j)) - \\ &\sum_{j=0}^{J-1} (X^{(1)}(\alpha_j+\tau)\psi(\alpha_j)) = \\ &= X^{(1)}(\alpha_J+\tau)\psi(\alpha_J) - X^{(1)}(\alpha_0+\tau)\psi(\alpha_0) \\ &= 0 \end{aligned}$$

Hence:

$$\begin{aligned} W(\tau) &= \int_{-\alpha}^{\alpha} x(t+\tau)\psi(t)dt \\ &= \sum_{j=0}^{J-1} \left( -\int_{\alpha_j}^{\alpha_{j+1}} X^{(1)}(t+\tau)\psi'(t)dt \right) \\ &= -\int_{-\alpha}^{\alpha} X^{(1)}(t+\tau)\psi'(t)dt \end{aligned} \tag{6}$$

By integrating (6) by parts and assuming, furthermore, that the linear piecewise function $\psi'(t)=2p_j t+q_j t\in[\alpha_j, \alpha_{j+1}]$ is continuous, we find:

$$W(\tau) = \int_{-\alpha}^{\alpha} x(t+\tau)\psi(t)dt = \int_{-\alpha}^{\alpha} X^{(2)}(t+\tau)\psi''(t)dt \tag{7}$$

where $X^{(2)}(t)$ is an order 2 primitive of the function $x(t)$, namely a function whose second derivative relative to t is $x(t)$.

To obtain (7), we utilized the fact that $\psi'(\tau)=0 \forall |t|\geq\alpha$.

The second derivative of $\psi(t)$ is a constant piecewise function:

$\psi''(t)=2p_j \forall t\in[\alpha_j, \alpha_{j+1}]$, which allows us to write:

$$W(\tau) = \sum_{j=0}^{J-1} \int_{\alpha_j}^{\alpha_{j+1}} X^{(2)}(t+\tau)\psi''(t)dt$$

-continued $$= \sum_{j=0}^{J-1} 2p_j \int_{\alpha_j}^{\alpha_{j+1}} X^{(2)}(t+\tau) dt$$

$$= \sum_{j=0}^{J-1} 2p_j \int_{\alpha_j}^{\alpha_{j+1}} X^{(2)}(t+\tau) dt =$$

$$= \sum_{j=0}^{J-1} 2p_j (X^{(3)}(\tau+\alpha_{j+1}) - X^{(3)}(\tau+\alpha_j))$$

$$= \sum_{j=1}^{J} 2p_{j-1} X^{(3)}(\tau+\alpha_j) - \sum_{j=0}^{J-1} 2p_j X^{(3)}(\tau+\alpha_j) =$$

$$= 2p_{J-1} X^{(3)}(\tau+\alpha_J) - 2p_0 X^{(3)}(\tau+\alpha_0) +$$

$$\sum_{j=1}^{J-1} 2(p_{j-1} - p_j) X^{(3)}(\tau+\alpha_j).$$

where $X^{(3)}(t)$ is an order 3 primitive of function x(t), namely a function whose third derivative relative to t is x(t).

We therefore obtain:

$$W(\tau) = \sum_{i=0}^{J} B_i X^{(3)}(\tau + \alpha_i) \qquad (8)$$

with:

$B_i = 2(p_{i-1} - p_i), i = 1, \ldots, J-1;$ $B_0 = -2p_0;$ $B_J = 2p_J.$

Assuming that the order 3 primitive of x(t) is known, J+1 multiplications and as many sums are required to determine a wavelet coefficient, instead of the (2α−1) multiplications and (2α−2) sums needed for the direct application of equation (2).

If the first derivative of the mother wavelet ψ(t) is not continuous, then the sum $$\sum_{j=0}^{J-1} X^{(2)}(t+\tau) \psi'(t) \bigg|_{\alpha_j}^{\alpha_{j+1}}$$

is no longer equal to zero.

An elementary calculation allows us to show that:

$$\sum_{j=0}^{J-1} X^{(2)}(t+\tau) \psi'(t) \bigg|_{\alpha_j}^{\alpha_{j+1}} = \sum_{j=0}^{J-1} (X^{(2)}(t+\tau)(2p_j t + q_j)) \bigg|_{\alpha_j}^{\alpha_{j+1}} =$$

$$= \sum_{j=1}^{J-1} \left( \begin{array}{c} 2\alpha_j(p_{j-1} - p_j) + \\ q_{j-1} - q_j \end{array} \right) X^{(2)}(\alpha_j + \tau) + -$$

$$(2p_0 \alpha_0 + q_0) X^{(2)}(\alpha_0 + \tau) +$$

$$(2p_{J-1} \alpha_J + q_{J-1}) X^{(2)}(\alpha_J + \tau).$$

The coefficient of wavelet W(τ) is therefore given by:

$$W(\tau) = \sum_{i=0}^{J} B_i X^{(3)}(\tau + \alpha_i) + (-1) \sum_{i=0}^{J} C_i X^{(2)}(\alpha_i + \tau) \qquad (9)$$

with:

$B_i = 2(p_{i-1} - p_i), i = 1, \ldots, J-1;$ $B_0 = -2p_0;$ $B_J = 2p_J;$ $C_i = 2\alpha_i(p_{i-1} - p_j) + q_{i-1} - q_i, i = 1, \ldots, J-1;$ $C_0 = -(2p_0 \alpha_0 + q_0);$ $C_J = 2p_{J-1} \alpha_J + q_{J-1}.$ In this case, the determination of a wavelet coefficient requires 2(J+1) sums and multiplications.

Equation (9) can be generalized to the case of any order of polynomial N. In this case, the mother wavelet ψ(t) can be expressed by:

$$\psi(t) = \begin{cases} \psi_j(t), & t \in [\alpha_j, \alpha_{j+1}] \\ 0, & |t| \geq a \end{cases}$$

with $\psi_j(t) = p_j^N t^N + p_j^{N-1} t^{N-1} + \ldots p_j^0,$

ψ(t) furthermore being a continuous function and such that ψ(−α)=ψ(α₀)=ψ(α_J)=ψ(α)=0.

By integrating (3) by parts (N+1) times, we obtain:

$$W(\tau) = \sum_{k=2}^{N+1} \sum_{i=0}^{J} (-1)^{k-1} C_i^k X^{(k)}(\tau + \alpha_i) \qquad (10)$$

with:

$C_i^k = \psi_{i-1}^{(k-1)}(\alpha_i) - \psi_i^{(k-1)}(\alpha_i), i = 1, \ldots, J-1,$ $C_0^k = -\psi_0^{(k-1)}(\alpha_0)$ $C_J^k = \psi_J^{(k-1)}(\alpha_J)$ Equation (10) shows that in general, the number of operations needed to determine a wavelet coefficient is proportional to the order N of the polynomials. However, this is not true if ψ(t) is chosen such that its derivatives are continuous, since several of the coefficients $C_i^k$ cancel each other out in this case. In the case of a piecewise polynomial function of order N, continuous and all of whose derivatives up to the order (N−1) are continuous, equation (10) is simplified as follows:

$$W(\tau) = (-1)^N \sum_{i=0}^{J} C_i^{(N+1)} X^{(N+1)}(\tau + \alpha_i) \qquad (11)$$

$C_i^{(N+1)} = N!(p_{i-1}^N - p_i^N), i = 1, \ldots, J-1$ $C_0^{(N+1)} = -N! p_0^N$ $C_J^{(N+1)} = N! p_J^N$ In this case, the computational cost does not depend on order N, and only the primitive of order (N+1) must be calculated. Consequently, in order to minimize the computational cost, it is necessary to use low-order polynomials and/or mother wavelets having continuous derivatives.

Until now, we have limited ourselves to the case of a constant scale factor s, conventionally taken to be 1. It is possible from now on to relax this assumption and to consider a wavelet $$\psi_s(t) = \frac{1}{\sqrt{s}} \psi_1\left(\frac{t}{s}\right),$$

which is continuous, defined on the interval $$\left[-\frac{\alpha}{s}, \frac{\alpha}{s}\right]$$

with the partition $$-\frac{\alpha}{s} = \frac{\alpha_0}{s} < \frac{\alpha_1}{s} < \ldots < \frac{\alpha_J}{s} = \frac{\alpha}{s},$$

piecewise polynomial, and whose expression is $$\psi_s(t) = \begin{cases} \psi_j^s(t), & t \in \left[\frac{\alpha_j}{s}, \frac{\alpha_{j+1}}{s}\right] \\ 0, & |t| \geq \frac{\alpha}{s} \end{cases}, \text{ with}$$

$$\psi_j^S(t) = (p_j^N)_s t^N + (p_j^{N-1})_s t^{N-1} + \ldots + (p_j^0)_s \text{ and } (p_j^i)_s$$

$$= \frac{1}{\sqrt{s}} \frac{1}{s^i} (p_j^i)_1.$$

In this general case, the wavelet coefficient $W_s(\tau)$ can be determined by applying the equation:

$$W_s(\tau) = \sum_{k=2}^{N+1} \sum_{i=0}^{J} (-1)^{k-1} C_i^k(s) X^{(k)}\left(\tau + \frac{\alpha_i}{s}\right) \quad (12)$$

with:

$$C_i^k(s) = (\psi_{i-1}^S)^{(k-1)}\left(\frac{\alpha_i}{s}\right) - (\psi_i^S)^{(k-1)}\left(\frac{\alpha_i}{s}\right),$$

$$i = 1, \ldots, J-1,$$

$$C_0^k(s) = -(\psi_0^S)^{(k-1)}\left(\frac{\alpha_0}{s}\right);$$

$$C_J^k(s) = (\psi_J^S)^{(k-1)}\left(\frac{\alpha_J}{s}\right).$$

It should be noted that the coefficients $C_i^k$ depend solely on the mother wavelet $\psi(t)$, and can therefore be calculated once and for all, even before the acquisition of signal x(t). The calculation of these coefficients does not therefore add to the processing time, and its computational cost is negligible.

In the particular case of a mother wavelet made up of order two polynomials, $\psi_1(\tau) = p_j t^2 + q_j t + r_j$ and, presenting a first continuous derivative, we obtain:

$$W(\tau) = \sum_{i=0}^{J} B_i X^{(3)}\left(\tau + \frac{\alpha_i}{s}\right) \quad (13)$$

with:

$$B_i = 2 \frac{1}{\sqrt{s}} \frac{1}{s^2}(p_{i-1} - p_i), i = 1, \ldots, J-1;$$

$$B_0 = -2 \frac{1}{\sqrt{s}} \frac{1}{s^2} p_0;$$

$$B_J = \frac{1}{\sqrt{s}} \frac{1}{s^2} 2 p_J.$$

Different approaches may be made for calculating primitives $X^{(1)}, \ldots, X^{(k)}, \ldots X^{(N+1)}$.

In general, the signal x(t) is in reality a discrete signal, or a continuous signal sampled at discrete instants: $x(t) \rightarrow x(i) = x_i$, $i = \ldots -1, 0, 1, 2, \ldots$. In order to calculate the primitives, it is possible in particular to use the approximation of the piecewise constant signal as a basis: $x(t) = x_i$, $t \in [i, i+1]$.

One notes that i is the value rounded to a lower integer of time t (with an appropriate timescale) $t: i = \lfloor t \rfloor$. One can therefore write $t = i + \Delta$, $\Delta = t - i \leq 1$.

Hence:

$$X^{(1)}(i + \Delta) = X^{(1)}(i) + \int_i^{i+\Delta} x_i \, dt = X^{(1)}(i) + x_i \Delta;$$

$$X^{(2)}(i + \Delta) = X^{(2)}(i) + \int_i^{i+\Delta} X^{(1)}(i + \Delta) dt$$

$$= X^{(2)}(i) + X^{(1)}(i)\Delta + x_i \frac{\Delta^2}{2};$$

$$X^{(3)}(i + \Delta) = X^{(3)}(i) + X^{(2)}(i)\Delta + X^{(1)}(i)\frac{\Delta^2}{2} + x_i \frac{\Delta^3}{6}$$

and so on.

One will note that the primitives are defined to a nearest integration constant. In the above equations, we implicitly accepted $X^{(3)}(0) = 0$ $X^{(2)}(0) = 0$ $X^{(1)}(0) = 0$, which allows said integration constants to be fixed.

If we are only interested in integer values of time t, we can put forward $\Delta = 1$, which gives:

$$X^{(1)}(i+1) = X^{(1)}(i) + x_i; \quad (14)$$

$$X^{(2)}(i+1) = X^{(2)}(i) + X^{(1)}(i) + \frac{x_i}{2};$$

$$X^{(3)}(i+1) = X^{(3)}(i) + X^{(2)}(i) + \frac{X^{(1)}(i)}{2} + \frac{x_i}{6}$$

and so on.

It is easy to understand that equations (14) make it possible to calculate the primitives by cumulative sums "during the process", in other words, during the time the samples of the signal x(t) are being acquired. This means that the calculation of the primitives does not increase the processing time, which is very advantageous in real time applications. Equations (14) were obtained on the basis of the approximation of the piecewise constant signal; similar equations can be obtained using a different interpolation, for example, a linear interpolation.

It should be noted that equations (14) give the values of the primitives of x(i) for all times i. However, the determination of the wavelet coefficients $W_s(\tau)$ only requires their values at times $$\tau + \frac{\alpha_i}{s}$$

(see equation 12). In other words, the primitives calculated by means of equations (14) must be sampled at (J+1) sampling points corresponding to said extremity points of the intervals on the support of the wavelet $\psi_s(t-\tau)$ obtained by dilating the mother wavelet $\psi(t)$ by a factor of s and by translating it by a time $\tau$. Only these samples are used to determine $W_s(\tau)$.

The different steps of the method we have just described are illustrated by FIG. 1. From left to right, one can see that, while the signal x(t) is being acquired—and when applicable, sampled, quantified and converted to digital format—block UCP calculates its primitives $X^{(2)}(t)$, $X^{(3)}(t) \ldots X^{(k)}(t) \ldots X^{(N+1)}(t)$ "during the process", for all of the values (that can be assumed to be discrete) of t. The blocks $E_2 \ldots E_k \ldots E_{N+1}$ then sample these primitives at times $$\tau + \frac{\alpha_i}{s}.$$

The primitives, sampled in this way, are convoluted in blocks $UCC_2 \ldots UCC_k \ldots UCC_{N+1}$ with the successions formed by the coefficients $C^2(s)$, $C_i^3(s) \ldots C_i^k(s) \ldots C_i^{N+1}(s)$ extracted from a memory MC—which corresponds, in equation (12), to the sum in relation to index J. The results of these convolutions are then linearly combined in an adder block UCL with a sign $(-1)^{k-1}$, in other words alternating between + or −, which corresponds, in equation 12, to the sum in relation to index k.

It should be noted that blocks UCP, $E_k$, $UCC_k$ et UCL are functional blocks, which do not necessarily correspond to physical structures of a processor used to implement the method.

Figure 2:
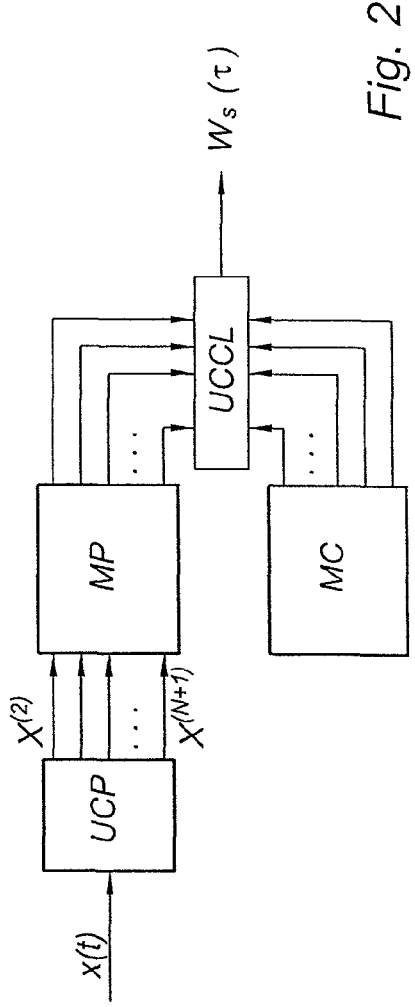
FIG. 2 illustrates a functional diagram of a processor for implementing a real time method according to an embodiment of the invention.

FIG. 2 illustrates the application of such a method to the wavelet transform in real time of a signal x(t), namely to the determination of the coefficients $W_s(\tau)$ for a plurality of values of $s=s_1, s_2 \ldots$ and $\tau=\tau_1, \tau_2 \ldots$ .

The block UCP calculates the primitives $X^{(k)}(t)$ during the process as cumulative sums of the samples of the signal x(t). The primitives calculated in this way are saved to the memory MP, which is preferably a mobile memory. At the same time, the previously calculated values of the primitives corresponding to the times $$\tau + \frac{\alpha_i}{s}$$

are read from said memory MP and addressed to a calculation unit UCCL. The coefficients $C_i^k(s)$ are also read from a second memory MC and addressed in turn to the unit UCCL. The latter determines the wavelet coefficients $W_s(\tau)$ as soon as this is possible. In fact, equation (12) shows that, in order to determine $W_s(\tau)$, it is necessary to know the primitives $X^{(k)}$ only in the interval $$\left[\tau \pm \frac{\alpha}{s}\right].$$

Consequently, at each instant t, it is possible to determine $$W_S(\tau) \forall \tau \leq t - \frac{\alpha}{s}.$$

The wavelet transform can therefore be performed in real time, with a time delay equal to $\alpha + T_p$ relative to the signal, $T_p$ being a delay due to the processing time.

Once again, the blocks UCP, MP, MC, UCCL must be considered as functional blocks, which do not necessarily correspond to physical structures of a processor used to implement the method.

The invention claimed is:

1. A method for determining at least one wavelet coefficient $W_s(\tau)$ of a wavelet transform of a signal obtained by sampling and quantifying an analog signal representative of a physical quantity, said wavelet transform being defined in relation to a mother wavelet, wherein:
    said mother wavelet is a continuous function, having a support subdivided into J≥1 intervals bound by (J+1) extremity points, said function being defined by a polynomial of a maximum level N≥1 on each said interval;
    and wherein said method includes the steps consisting in:
    a) calculating all or some of the primitives of said signal of order k comprised between 2 and N+1, at least at (J+1) points corresponding to said extremity points of the intervals of the wavelet support dilated by a factor of s and translated by a time $\tau$;
    b) calculating the convolution of said or each said primitive sampled in this way with a respective succession of (J+1) coefficients $C_i^k(s)$, dependent upon said wavelet; and
    c) determining said wavelet coefficient by calculating a linear combination of said convolutions;
    said steps a) to c) being implemented by a processor configured or programmed in an appropriate manner in a neuronal control or brain-computer interface system.

2. The method as claimed in claim 1, in which said coefficients $C_i^k(s)$ are dependent upon the discontinuities of the derivatives of orders between 1 and N of the wavelet corresponding to said extremity points of the intervals constituting its support.

3. The method as claimed in claim 2, in which steps b) and c) are implemented by applying the following equation:

$$W_s(\tau) = \sum_{k=2}^{N+1} \sum_{i=0}^{J} (-1)^{k-1} C_i^k(s) X^{(k)}\left(\tau + \frac{\alpha_i}{s}\right)$$

where:
    $W_s(\tau)$ is the desired wavelet coefficient, corresponding to a time delay $\tau$ and to a dilatation s of a mother wavelet $\psi(t)$;
    $X^{(k)}(t)$ is the order k primitive of the signal;
    $\alpha_i$ are the extremity points of the intervals constituting the support of the mother wavelet, taken in order; and
    $C_i^k(s)$, with i between 0 and J, are the coefficients forming the succession with which the order k primitive of the signal is convoluted.

4. The method as claimed in claim 3 in which the coefficients $C_i^k(s)$ are given by:

$$C_i^k(s) = (\psi_{i-1}^s)^{(k-1)}\left(\frac{\alpha_i}{s}\right) - (\psi_i^s)^{(k-1)}\left(\frac{\alpha_i}{s}\right),$$

$$i = 1, \ldots, J-1$$

$$C_0^k(s) = -(\psi_0^s)^{(k-1)}\left(\frac{\alpha_0}{s}\right)$$

$$C_J^k(s) = (\psi_J^s)^{(k-1)}\left(\frac{\alpha_J}{s}\right)$$

where $(\psi_i^s)^{(k-1)}$ is the derivative of order (k−1) of the function $$\psi_i^s = \psi_i^s(t) = \frac{1}{\sqrt{s}}\psi_i\left(\frac{t}{s}\right),$$

$\psi_i$ being the polynomial that defines the mother wavelet on the $i^{th}$ interval of its support.

5. The method as claimed in claim 1, in which said wavelet is a continuous function and has a first continuous derivative, piecewise polynomial of order of two, in which said step a) consists in calculating only the primitive of order 3 of said signal and in which steps b) and c) are implemented by applying the following equation:

$$W(\tau) = \sum_{i=0}^{J} B_i X^{(3)}\left(\tau + \frac{\alpha_i}{s}\right)$$

where:

$$B_i = 2\frac{1}{\sqrt{s}}\frac{1}{s^2}(p_{i-1} - p_i), i = 1, \ldots, J-1;$$

$$B_0 = -2\frac{1}{\sqrt{s}}\frac{1}{s^2}p_0;$$

$$B_J = \frac{1}{\sqrt{s}}\frac{1}{s^2}2p_J.$$

6. The method as claimed in claim 1, in which said step a) includes:

a1) calculation of said order k primitives between 2 and N+1 of said signal; and a2) their sampling at (J+1) sampling points corresponding to said extremity points of the intervals on the wavelet support dilated by a factor of s and translated by a time $\tau$.

7. The method as claimed in claim 1, in which said step a) is implemented in real time, said primitives being calculated as cumulative sums during an acquisition step of said signal, then saved to a first memory (MP) of said processor.

8. The method as claimed in claim 7, in which said successions of coefficients $C_i^k(s)$ are saved to a second memory (MC) of said processor prior to said acquisition step of said signal.

9. A method for wavelet transform of a signal in discrete or discretized time, comprising the determination of a plurality of wavelet coefficients associated with different dilatations/translations of a single mother wavelet, wherein each said wavelet coefficient is determined by a method as claimed in claim 1.

10. A method for wavelet transform of a signal comprising the determination of a plurality of wavelet coefficients associated with different dilatations/translations of a single mother wavelet, wherein each wavelet coefficient $W_s(\tau)$, corresponding to a time delay $\tau$ and to a dilatation s of a mother wavelet $\psi(t)$, is determined by a method as claimed in claim 1, in which:

said step a) is implemented in real time, said primitives being calculated as cumulative sums during an acquisition step of said signal, then saved to a first memory (MP) of said processor;

said steps b) and c) are implemented in real time, using successions of coefficients saved beforehand to a second memory (MC) of said processor;

the wavelet coefficients $W_s(\tau)$, corresponding to a time delay $\tau$ and to a dilatation s of a mother wavelet $\psi(t)$, being determined from the time $t=\tau+\alpha/s$, where $\alpha$ is half the width of the support of said mother wavelet.

11. The method as claimed in claim 1, in which said signal is a digital signal.

12. The method as claimed in claim 1, in which the signal is a signal acquired by a detector.

13. A processor configured or programmed to implement a method as claimed in claim 1.

* * * * *